(12) United States Patent
Wood et al.

(10) Patent No.: US 12,413,518 B2
(45) Date of Patent: Sep. 9, 2025

(54) MAPPING OF IPSec TUNNELS TO SD-WAN SEGMENTATION

(71) Applicant: Cisco Technology, Inc., San Jose, CA (US)

(72) Inventors: Steven Wood, Ottawa (CA); Balaji Sundararajan, Fremont, CA (US); Laxmikantha Reddy Ponnuru, San Ramon, CA (US); Avinash Shah, Pleasanton, CA (US); Pritam Baruah, Fremont, CA (US); Venkatesh Nataraj, Union City, CA (US); Ganesh Devendrachar, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 2 days.

(21) Appl. No.: 18/409,701

(22) Filed: Jan. 10, 2024

(65) Prior Publication Data

US 2025/0071060 A1     Feb. 27, 2025

Related U.S. Application Data

(60) Provisional application No. 63/578,937, filed on Aug. 25, 2023.

(51) Int. Cl.
 *H04L 45/76*    (2022.01)
 *H04L 12/46*    (2006.01)

(52) U.S. Cl.
 CPC .......... *H04L 45/76* (2022.05); *H04L 12/4633* (2013.01)

(58) Field of Classification Search
 None
 See application file for complete search history.

(56) References Cited

U.S. PATENT DOCUMENTS

| | | | |
|---|---|---|---|
| 10,826,775 B1* | 11/2020 | Moreno | H04L 41/0893 |
| 11,799,831 B2* | 10/2023 | Vemulpali | H04L 61/5007 |
| 2016/0212098 A1 | 7/2016 | Roch | |
| 2016/0380823 A1* | 12/2016 | Shen | H04L 12/4633 370/254 |
| 2016/0380973 A1* | 12/2016 | Sullenberger | H04L 63/029 726/15 |
| 2017/0012870 A1* | 1/2017 | Blair | H04L 45/74 |
| 2020/0014661 A1* | 1/2020 | Mayya | H04L 49/35 |
| 2021/0036987 A1* | 2/2021 | Mishra | H04L 12/4641 |
| 2021/0044565 A1* | 2/2021 | Moreno | H04L 63/029 |
| 2021/0218598 A1* | 7/2021 | Ganapathy | H04L 45/64 |
| 2021/0226817 A1* | 7/2021 | Oswal | H04L 12/4679 |
| 2021/0399920 A1* | 12/2021 | Sundararajan | H04L 41/0893 |
| 2022/0052947 A1* | 2/2022 | Baruah | H04L 45/02 |
| 2022/0078109 A1* | 3/2022 | Hong | H04L 49/354 |
| 2022/0272033 A1* | 8/2022 | Jain | H04L 45/302 |

(Continued)

*Primary Examiner* — Phyllis A Book
(74) *Attorney, Agent, or Firm* — Polsinelli P.C.

(57) ABSTRACT

Generally, Software-Defined Wide Area Networks (SD-WAN) generally do not support network segmentation. The concepts disclosed herein connects IPSec SD-WAN fabric to a Virtual Routing and Forwarding (VRF) router and make use of a Software Defined Cloud Interconnect (SDCI) Router to route traffic from IPSec SD-WAN to various cloud services from the SDCI Router in the fabric. The concepts disclosed herein also provides for tunnel multi-plexing that takes incoming and outgoing traffic and maps VPNs to any service VRF associated with the cloud based services.

20 Claims, 9 Drawing Sheets

(56) References Cited

U.S. PATENT DOCUMENTS

| | | | |
|---|---|---|---|
| 2022/0329477 A1* | 10/2022 | Chiganmi | H04L 41/0654 |
| 2023/0093190 A1 | 3/2023 | Ramachandran et al. | |
| 2023/0188502 A1* | 6/2023 | Thoria | H04L 12/4633 |
| | | | 726/15 |
| 2023/0231802 A1 | 7/2023 | Vysotsky et al. | |
| 2023/0336377 A1* | 10/2023 | Hou | H04L 12/4604 |
| 2024/0406101 A1* | 12/2024 | Hawari | H04L 45/74 |

* cited by examiner

MAPPING OF IPSec TUNNELS TO SD-WAN SEGMENTATION

CROSS-REFERENCES TO RELATED APPLICATIONS

This application claims priority to a U.S. Provisional Application No. 63/578,937, filed on Aug. 25, 2023, which is hereby incorporated by reference in its entirety.

BACKGROUND

In a software-defined wide area network (SD-WAN), SD-WAN services are commonly deployed across a plurality of different "branches" of an SD-WAN, where each "branch" can represent a site (e.g., an office) of an interconnected network. Some branches may utilize devices that do not support segmentation, such as devices utilizing IPSec Tunnels, and generally do not connect with cloud-based networks.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DESCRIPTION

Figure 1:
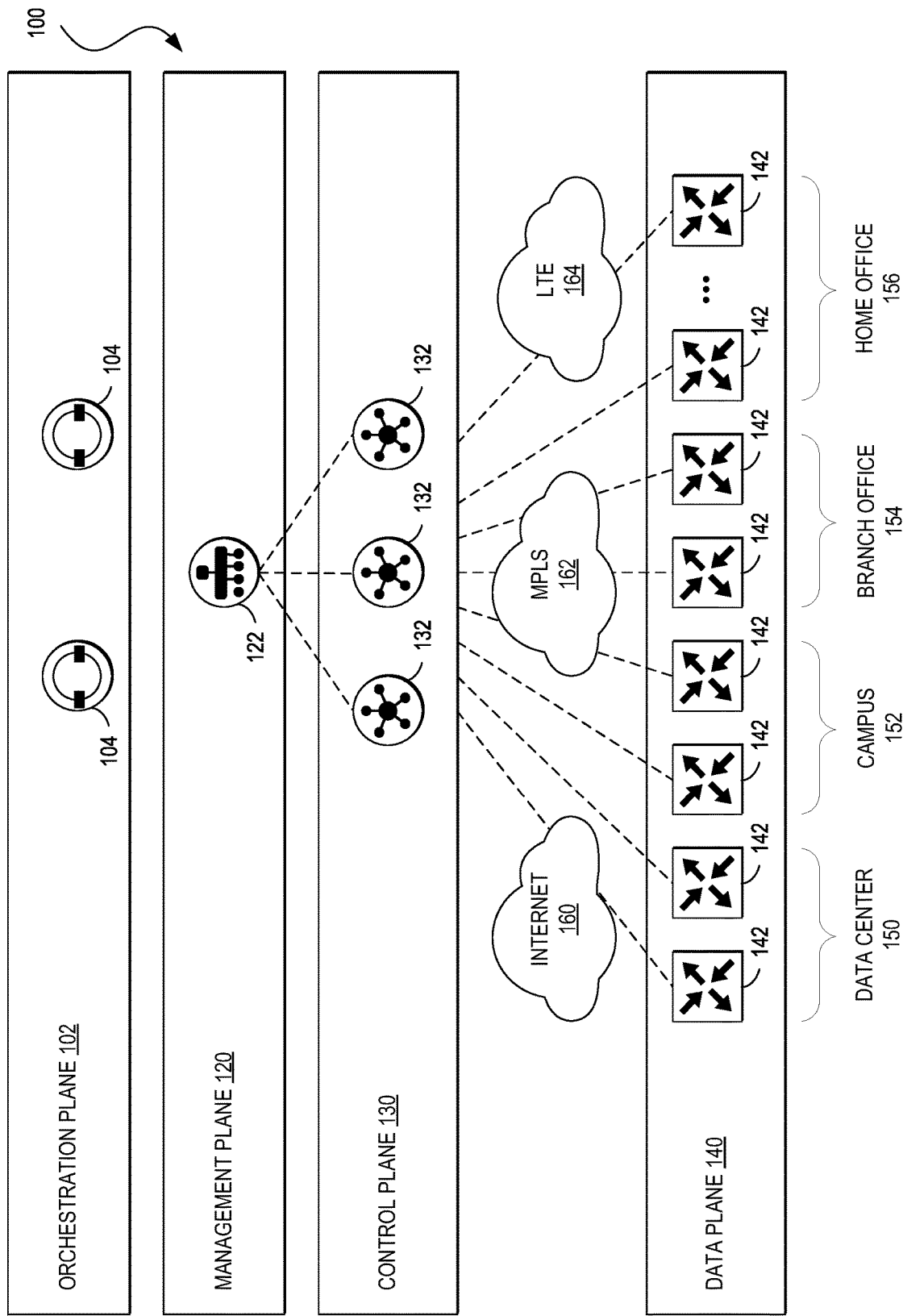
FIG. 1 illustrates an example of a high-level network architecture in accordance with some embodiments.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

In some aspects, the techniques described herein relate to a method including: receiving, by a Virtual Routing and Forwarding (VRF) Router, a flow of traffic bound for a destination from a Local Area Network (LAN) side of a Software-Defined Wide Area Network (SD-WAN) router over an IPSec tunnel, wherein the destination of the flow of traffic is a cloud based service; determining, by the VRF Router, an IP address associated with the LAN side of the SD-WAN router; determining, by the VRF Router, a Virtual Routing and Forwarding (VRF) segment in a SD-WAN fabric associated with the cloud based service; mapping, by the VRF Router, the VRF segment to the IP address of the LAN side; forwarding the flow of traffic originating from the LAN side of the router on the VRF segment associated with the cloud based service; and sending the flow of traffic to the destination via the VRF Router.

In some aspects, the techniques described herein relate to a method, further including: receiving, by the VRF Router, the flow of traffic from the destination; determining, by the VRF Router, the IP address of the destination associated with the cloud based service and the mapping of the IP address of the LAN side to the VRF segment; and sending the flow of traffic via the IPSec tunnel to the LAN side of the SD-WAN router.

In some aspects, the techniques described herein relate to a method, wherein the IP address of the LAN side of the SD-WAN router includes a IP-Security Group Tag (IP-SGT) binding.

In some aspects, the techniques described herein relate to a method, wherein the IPSec tunnel performs multiplexing, the method further including: mapping, by the VRF Router, one or more IP-SGT bindings to one or more VRF segments associated with one or more cloud-based destinations; multiplexing the VRF segments in the IPSec tunnel; segmenting, by the VRF Router, the one or more VRF segments based on the mapping; and sending the traffic to the one or more cloud-based destinations by the one or more VRF segments.

In some aspects, the techniques described herein relate to a method, wherein the mapping of the IP-SGT binding to the VRF segment is updated on a global VRF-Common Flow Table.

In some aspects, the techniques described herein relate to a method, wherein the global VRF-Common Flow Table is stored within an Identity Service Engine associated with the VRF Router and the LAN side of the SD-WAN router.

In some aspects, the techniques described herein relate to a method, wherein the VRF Router is a Software-Defined Cloud Interconnect (SDCI) router.

In some aspects, the techniques described herein relate to a system including: a storage configured to store instructions; and a processor configured to execute the instructions and cause the processor to: receive, by a Virtual Routing and Forwarding (VRF) router, a flow of traffic bound for a destination from a Local Area Network (LAN) side of a Software-Defined Wide Area Network (SD-WAN) router over an IPSec tunnel, wherein the destination of the flow of traffic is a cloud based service; determine, by the VRF Router, an IP address associated with the LAN side of the SD-WAN router; determine, by the VRF Router, a Virtual Routing and Forwarding (VRF) segment in a SD-WAN fabric associated with the cloud based service; map, by the VRF Router, the VRF segment to the IP address of the LAN side; forward the flow of traffic originating from the LAN side of the router on the VRF segment associated with the cloud based service; and send the flow of traffic to the destination via the VRF Router.

In some aspects, the techniques described herein relate to a method including: receiving, by a Virtual Routing and Forwarding (VRF) router, a flow of traffic bound for a Local Area Network (LAN) side of a Software-Defined Wide Area Network (SD-WAN) router from a cloud-based service; determining, by the VRF Router, a Virtual Routing and Forwarding (VRF) segment in a SD-WAN fabric associated with the cloud-based service; determining, by the VRF Router, an IP address associated with the LAN side of the SD-WAN router; mapping, by the VRF Router, the VRF segment to the IP address of the LAN side; forwarding the flow of traffic originating from the cloud-based service from the VRF segment associated with the cloud based service to an IPSec tunnel associated with the LAN side of the SD-WAN router; and sending the flow of traffic to the LAN side of the SD-WAN router via the IPSec tunnel.

In some aspects, the techniques described herein relate to a method, further including: receiving, by the VRF Router, the flow of traffic from the LAN side of the SD-WAN router over the IPSec tunnel; determining, by the VRF Router, the VRF segment associated with the cloud based service based on the mapping of the IP address of the LAN side to the VRF segment; and sending, by the VRF Router, the flow of traffic to the cloud based service over the VRF segment.

In some aspects, the techniques described herein relate to a method, wherein the IP address of the LAN side of the SD-WAN router includes an IP-Security Group Tag (IP-SGT) binding.

In some aspects, the techniques described herein relate to a method, wherein the IPSec tunnel performs multiplexing, the method further including: mapping, by the VRF Router, one or more IP-SGT bindings to one or more VRF segments associated with one or more cloud-based destinations; multiplexing the VRF segments in the IPSec tunnel; segmenting, by the VRF Router, the one or more VRF segments based on the mapping; and sending the traffic to the one or more cloud-based destinations by the one or more VRF segments.

In some aspects, the techniques described herein relate to a method, wherein the mapping of the IP-SGT binding to the VRF segment is updated on a VRF-Common Flow Table.

In some aspects, the techniques described herein relate to a method, wherein the VRF-Common Flow Table is stored within an Identity Service Engine associated with the VRF Router and the LAN side of the SD-WAN router.

Example Embodiments

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Some routers have multiple LAN and WAN ports that connect LAN networks with Wide Area Network (WAN)-based provider networks. However, some of these routers do not support network segmentation because they rely on IPSec Tunnels to connect the LAN network with the WAN-based provider network. In other words, current technologies do not segment traffic coming from these types of routers. Thus, there is a need for a system, method, or computer-readable media to connect an IPSec-WAN fabric to a Virtual Routing and Forwarding (VRF) Router/VRF routing gateway implementation using network segmentation and route traffic from networks generally connected to the Internet over IPSec Tunnels to various other cloud-based services over networks that route traffic using segmentation technologies.

The technology disclosed herein addresses this need in the industry. In particular, the present technology connects an IPSec-WAN fabric to a VRF Router/VRF segment base routing fabric and also makes use of a Software Defined Cloud Interconnect (SDCI) Router to route traffic from the IPSec-WAN fabric to various cloud services from the SDCI Router in the fabric.

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane can 102 assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for central configuration and monitoring of a network. The management plane 120 can include one or more physical or virtual network management appliances 122. In some embodiments, the network management appliance(s) 122 can provide centralized management of the network via a graphical user interface to enable a user to monitor, configure, and maintain the edge network devices 142 and links (e.g., Internet transport network 160, MPLS network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 154, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QOS), and routing (e.g., BGP, OSPF, etc.), among other tasks. In some embodiments, physical or virtual Cisco® SD-WAN vEdge routers can operate as the edge network devices 142.

Figure 2:
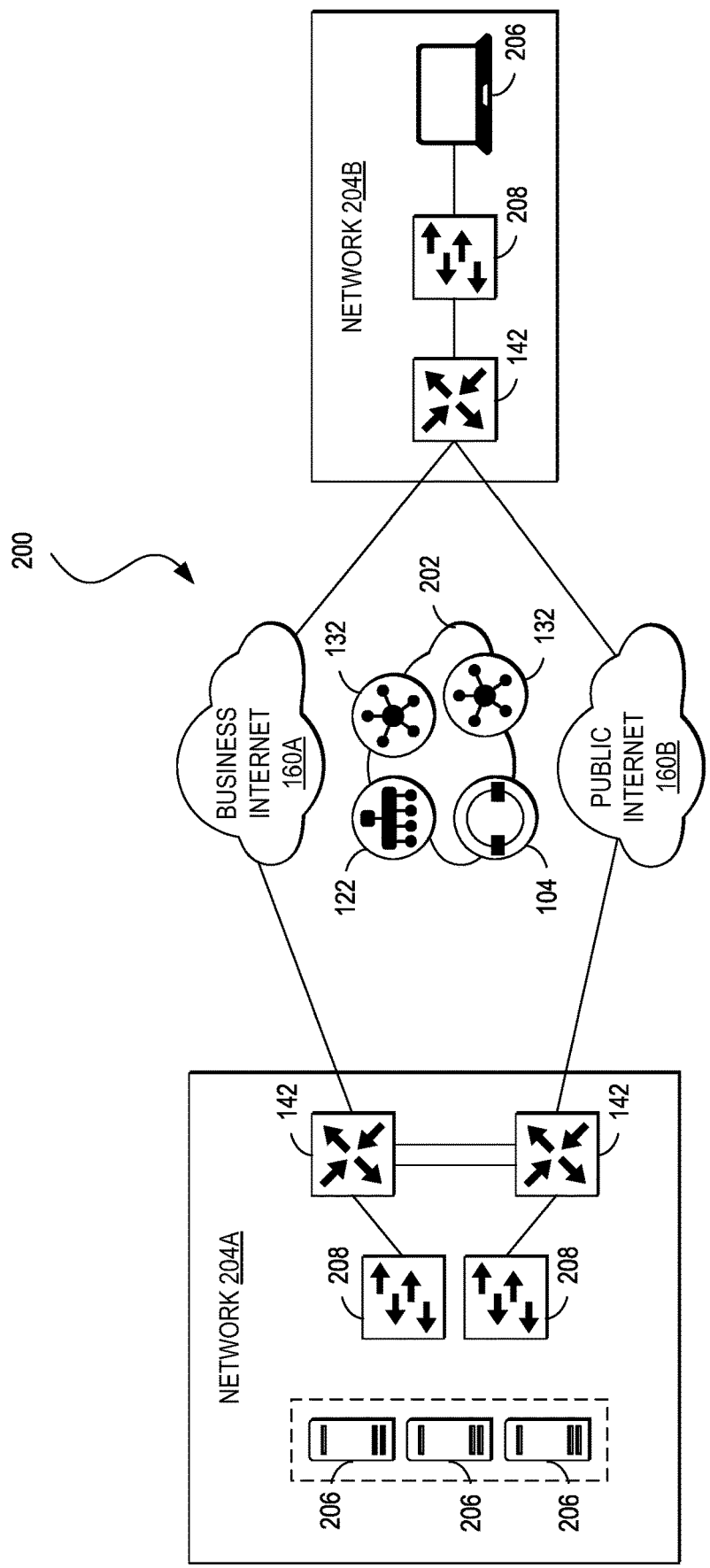
FIG. 2 illustrates an example of a network topology in accordance with some embodiments.

FIG. 2 illustrates an example of a network topology 200 for showing various aspects of the network architecture 100. The network topology 200 can include a management network 202, a pair of network sites 204A and 204B (collectively, 204) (e.g., the data center(s) 150, the campus network (s) 152, the branch office network(s) 154, the home office network(s) 156, cloud service provider network(s), etc.), and a pair of Internet transport networks 160A and 160B (collectively, 160). The management network 202 can include one or more network orchestrator appliances 104, one or more network management appliance 122, and one or more network controller appliances 132. Although the management network 202 is shown as a single network in this example, one of ordinary skill in the art will understand that each element of the management network 202 can be distributed across any number of networks and/or be co-located with the sites 204. In this example, each element of the management network 202 can be reached through either transport network 160A or 160B.

Each site can include one or more endpoints 206 connected to one or more site network devices 208. The endpoints 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), car devices, etc.), and so forth. The endpoints 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network devices 208 can include physical or virtual switches, routers, and other network devices. Although the site 204A is shown including a pair of site network devices and the site 204B is shown including a single site network device in this example, the site network devices 208 can comprise any number of network devices in any network topology, including multi-tier (e.g., core, distribution, and access tiers), spine-and-leaf, mesh, tree, bus, hub and spoke, and so forth. For example, in some embodiments, one or more data center networks may implement the Cisco® Application Centric Infrastructure (ACI) architecture and/or one or more campus networks may implement the Cisco® Software Defined Access (SD-Access or SDA) architecture. The site network devices 208 can connect the endpoints 206 to one or more edge network devices 142, and the edge network devices 142 can be used to directly connect to the transport networks 160.

In some embodiments, "color" can be used to identify an individual WAN transport network, and different WAN transport networks may be assigned different colors (e.g., mpls, private1, biz-internet, metro-ethernet, lte, etc.). In this example, the network topology 200 can utilize a color called "biz-internet" for the Internet transport network 160A and a color called "public-internet" for the Internet transport network 160B.

In some embodiments, each edge network device 208 can form a Datagram Transport Layer Security (DTLS) or TLS control connection to the network controller appliance(s) 132 and connect to any network control appliance 132 over each transport network 160. In some embodiments, the edge network devices 142 can also securely connect to edge network devices in other sites via IPSec tunnels. In some embodiments, the BFD protocol may be used within each of these tunnels to detect loss, latency, jitter, and path failures.

On the edge network devices 142, color can be used help to identify or distinguish an individual WAN transport tunnel (e.g., no same color may be used twice on a single edge network device). Colors by themselves can also have significance. For example, the colors metro-ethernet, mpls, and private1, private2, private3, private4, private5, and private6 may be considered private colors, which can be used for private networks or in places where there is no NAT addressing of the transport IP endpoints (e.g., because there may be no NAT between two endpoints of the same color). When the edge network devices 142 use a private color, they may attempt to build IPSec tunnels to other edge network devices using native, private, underlay IP addresses. The public colors can include 3g, biz, internet, blue, bronze, custom1, custom2, custom3, default, gold, green, lte, public-internet, red, and silver. The public colors may be used by the edge network devices 142 to build tunnels to post-NAT IP addresses (if there is NAT involved). If the edge network devices 142 use private colors and need NAT to communicate to other private colors, the carrier setting in the configuration can dictate whether the edge network devices 142 use private or public IP addresses. Using this setting, two private colors can establish a session when one or both are using NAT.

Figure 3:
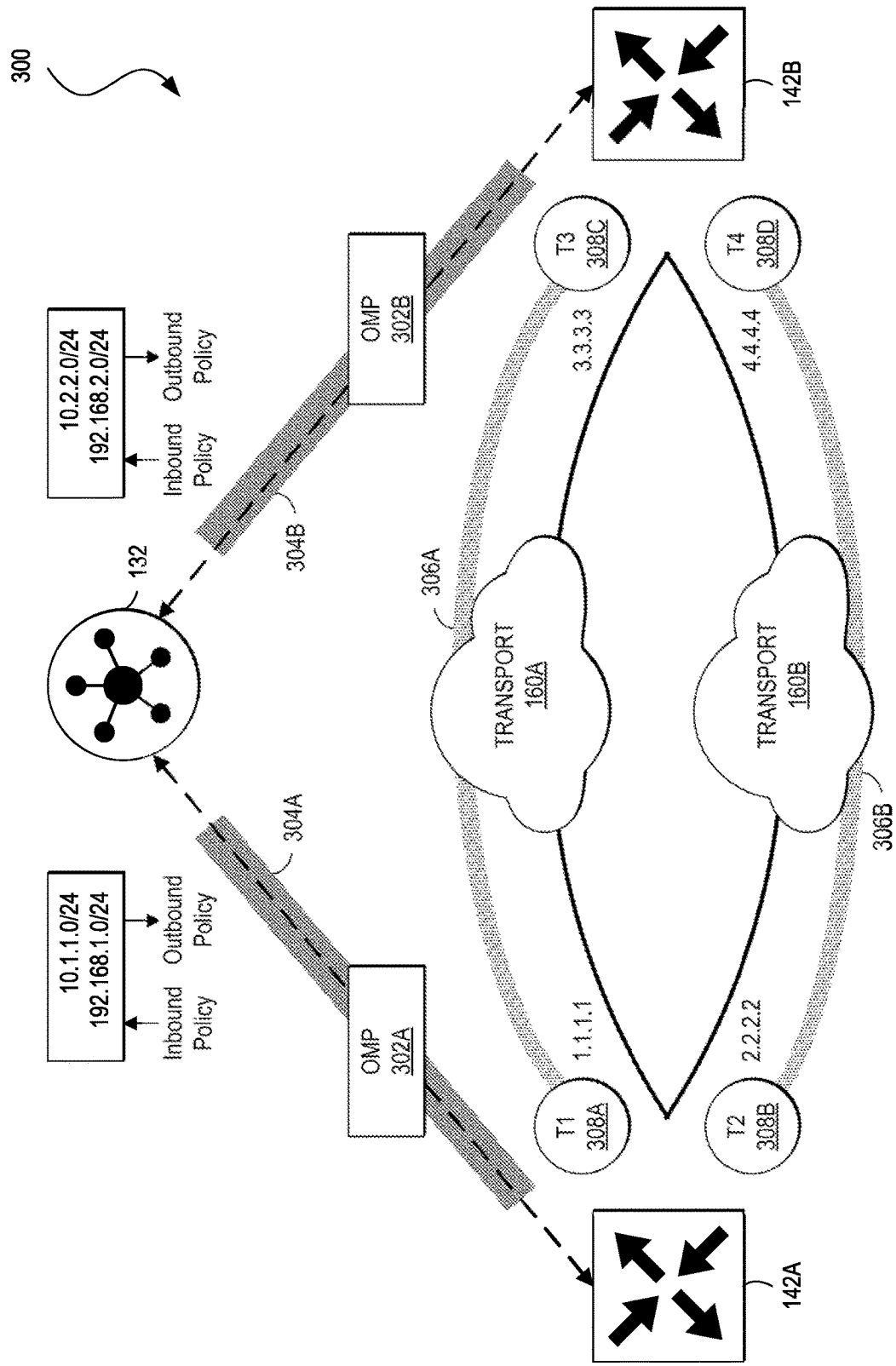
FIG. 3 illustrates an example of a diagram showing the operation of a protocol for managing an overlay network in accordance with some embodiments.

FIG. 3 illustrates an example of a diagram 300 showing the operation of OMP, which may be used in some embodiments to manage an overlay of a network (e.g., the network architecture 100). In this example, OMP messages 302A and 302B (collectively, 302) may be transmitted back and forth between the network controller appliance 132 and the edge network devices 142A and 142B, respectively, where control plane information, such as route prefixes, next-hop routes, crypto keys, policy information, and so forth, can be exchanged over respective secure DTLS or TLS connections 304A and 304B. The network controller appliance 132 can operate similarly to a route reflector. For example, the network controller appliance 132 can receive routes from the edge network devices 142, process and apply any policies to them, and advertise routes to other edge network devices 142 in the overlay. If there is no policy defined, the edge network devices 142 may behave in a manner similar to a full mesh topology, where each edge network device 142 can connect directly to another edge network device 142 at another site and receive full routing information from each site.

OMP can advertise three types of routes:

OMP routes, which can correspond to prefixes that are learned from the local site, or service side, of the edge network device 142. The prefixes can be originated as static or connected routes, or from within, for example, the OSPF or BGP protocols, and redistributed into OMP so they can be carried across the overlay. OMP routes can advertise attributes such as transport location (TLOC) information (which can similar to a BGP next-hop IP address) and other attributes such as origin, originator, preference, site identifier, tag, and virtual private network (VPN). An OMP route may be installed in the forwarding table if the TLOC to which it points is active.

TLOC routes, which can correspond to logical tunnel termination points on the edge network devices 142 that connect into the transport networks 160. In some embodiments, a TLOC route can be uniquely identified and represented by a three-tuple, including an IP address, link color, and encapsulation (e.g., Generic Routing Encapsulation (GRE), IPSec, etc.). In addition to system IP address, color, and encapsulation, TLOC routes can also carry attributes such as TLOC private and public IP addresses, carrier, preference, site identifier, tag, and weight. In some embodiments, a TLOC may be in an active state on a particular edge network device 142 when an active BFD session is associated with that TLOC.

Service routes, which can represent services (e.g., firewall, distributed denial of service (DDoS) mitigator, load balancer, intrusion prevent system (IPS), intrusion detection systems (IDS), WAN optimizer, etc.) that may be connected to the local sites of the edge network devices 142 and accessible to other sites for use with service insertion. In addition, these routes can also include VPNs; the VPN labels can be sent in an update type to tell the network controller appliance 132 what VPNs are serviced at a remote site.

In the example of FIG. 3, OMP is shown running over the DTLS/TLS tunnels 304 established between the edge network devices 142 and the network controller appliance 132. In addition, the diagram 300 shows an IPSec tunnel 306A established between TLOC 308A and 308C over the WAN transport network 160A and an IPSec tunnel 306B established between TLOC 308B and TLOC 308D over the WAN transport network 160B. Once the IPSec tunnels 306A and 306B are established, BFD can be enabled across each of them.

Figure 4:
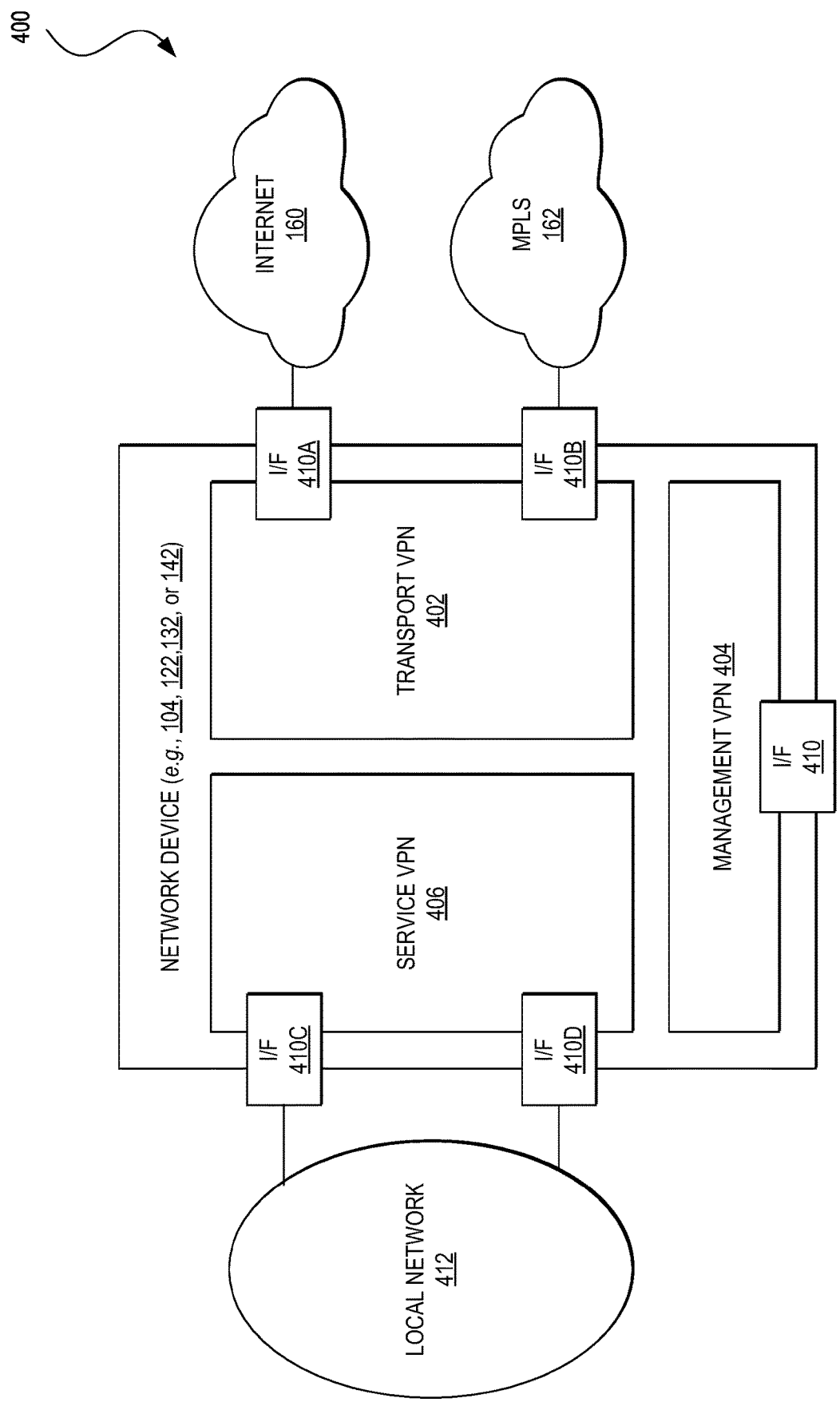
FIG. 4 illustrates an example of a diagram showing the operation of virtual private networks for segmenting a network in accordance with some embodiments.

FIG. 4 illustrates an example of a diagram 400 showing the operation of VPNs, which may be used in some embodiments to provide segmentation for a network (e.g., the network architecture 100). VPNs can be isolated from one another and can have their own forwarding tables. An interface or sub-interface can be explicitly configured under a single VPN and may not be part of more than one VPN. Labels may be used in OMP route attributes and in the packet encapsulation, which can identify the VPN to which a packet belongs. The VPN number can be a four-byte integer with a value from 0 to 65530. In some embodiments, the network orchestrator appliance(s) 104, network management appliance(s) 122, network controller appliance(s) 132, and/or edge network device(s) 142 can each include a transport VPN 402 (e.g., VPN number 0) and a management VPN 404 (e.g., VPN number 512). The transport VPN 402 can include one or more physical or virtual network interfaces (e.g., network interfaces 410A and 410B) that respectively connect to WAN transport networks (e.g., the MPLS network 162 and the Internet transport network 160). Secure DTLS/TLS connections to the network controller appliance (s) 132 or between the network controller appliance(s) 132 and the network orchestrator appliance(s) 104 can be initiated from the transport VPN 402. In addition, static or default routes or a dynamic routing protocol can be configured inside the transport VPN 402 to get appropriate next-hop information so that the control plane 130 may be established and IPSec tunnels 306 (not shown) can connect to remote sites.

The management VPN 404 can carry out-of-band management traffic to and from the network orchestrator appliance(s) 104, network management appliance(s) 122, network controller appliance(s) 132, and/or edge network device(s) 142 over a network interface 410C. In some embodiments, the management VPN 404 may not be carried across the overlay network.

In addition to the transport VPN 402 and the management VPN 404, the network orchestrator appliance(s) 104, network management appliance(s) 122, network controller appliance(s) 132, or edge network device(s) 142 can also include one or more service-side VPNs 406. The service-side VPN 406 can include one or more physical or virtual network interfaces (e.g., network interfaces 410C and 410D) that connect to one or more local-site networks 412 and carry user data traffic. The service-side VPN(s) 406 can be enabled for features such as OSPF or BGP, Virtual Router Redundancy Protocol (VRRP), QOS, traffic shaping, policing, and so forth. In some embodiments, user traffic can be directed over IPSec tunnels to other sites by redistributing OMP routes received from the network controller appliance (s) 132 at the site 412 into the service-side VPN routing protocol. In turn, routes from the local site 412 can be advertised to other sites by advertising the service VPN routes into the OMP routing protocol, which can be sent to the network controller appliance(s) 132 and redistributed to other edge network devices 142 in the network. Although the network interfaces 410A-E (collectively, 410) are shown to be physical interfaces in this example, one of ordinary skill in the art will appreciate that the interfaces 410 in the transport and service VPNs can also be sub-interfaces instead.

Figure 5:
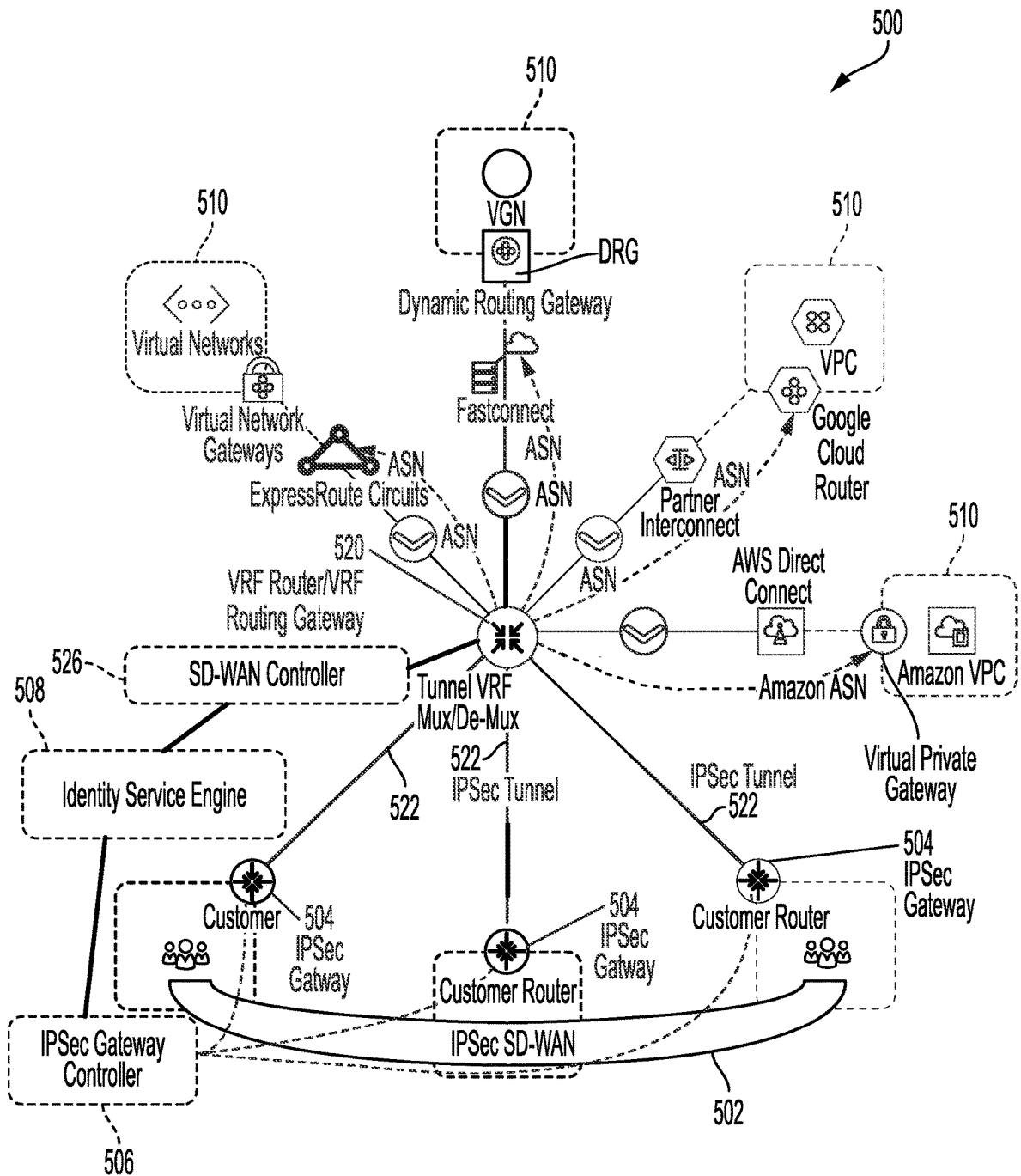
FIG. 5 illustrates a network environment for enabling standard based IPSec connectivity from IPSec gateways to a VRF Router/VRF routing gateway in accordance with some embodiments.

FIG. 5 illustrates network environment 500 for enabling standard based IPSec connectivity from the IPSec gateways 504 of the IPSec SD-WAN 502 to the VRF Router/VRF routing gateways 520 solution, thereby enabling LAN traffic to reach cloud-based network 510 services and servers via the VRF Router/VRF routing gateway 520. In some embodiments, the cloud-based networks 510 may be local cloud-based destinations, or may be third party cloud-based network 510 services and servers, such as Amazon Web Services (AWS) cloud, Azure cloud, Oracle cloud, Google cloud, Microsoft dynamic, CRM, GCP, or any other third-party cloud-based network 510.

In particular, in some embodiments, the present technology enables tunnel Virtual Routing and Forwarding (VRF) Multi-Plexing on a VPN (Virtual Private Network) on the VRF Router/VRF routing gateway 520. In particular, when VRF traffic comes and goes from different cloud-based networks 510, the VRF traffic may be translated to specific IPSec tunnels 522 such that the VRF traffic coming and going from the cloud-based networks 510 may be connected to the IPSec Gateways 504 of the IPSec SD-WAN.

Furthermore, the present technology connects the IPSec gateways 504 to the VRF Router/VRF routing gateway 520 having a tunnel VRF using the IPSec tunnels 522. As discussed further below with respect to FIG. 7, the IPSec tunnels 522 can be multiplexed, such that the VRF traffic can be mapped to a specific IPSec tunnel 522 that may be part of a group of tunnels that are multiplexed into a larger tunnel. As further discussed below, this configuration allows the VRF Router/VRF routing gateway 520 to know which specific IPSec tunnel 522 the VRF traffic is sent on.

Furthermore, the present technology enables IPSec gateways 504 to export an IP-SGT (Security Group Tag) binding associated with the IPSec gateways 504 of the IPSec SD-WAN 502 using an Identity Service Engine (ISE) 508 in a global IPSec SD-WAN Fabric. Furthermore, the VRF Router/VRF routing gateway 520 will learn the IP-SGT bindings, and using the same ISE 508, may map the IP-SGT bindings to the VRF 520 in IPSec SD-WAN Fabric. In particular, the IPSec gateways 504 are connected to an IPSec gateway controller 506 which manages all of the IPSec gateways 504. The IPSec gateway controller 506 connects to and communicates with the ISE 508, and is capable of taking the IP addresses and IP-SGT bindings and storing them on the ISE 508. Furthermore, the VRF Router/VRF routing gateway 520 connects to and communicates with a SD-WAN controller 526 that is also in communication with the ISE 508. While this SD-WAN controller 526 may not forward or direct any of the VRF traffic itself, it is capable of identifying the source or destination of the VRF traffic coming from the cloud-based networks 510, and sends this information to the ISE 508. The ISE 508 then maintains a mapping table (as discussed further below) to determine which VRF traffic goes to which IPSec gateway 504. Thus, the VRF Router/VRF routing gateway 520, which programs and communicates with the SD-WAN controller 526, will connect to the IPSec gateways 504 via the IPSec tunnels 522 in VPN 0 with the VRF-IP-SGT bindings mapped by the ISE 508 due to the ISE 508 connection with the IPSec gateway controller 506. Further, because of this configuration, the VRF Router/VRF routing gateway 520 may also enable reverse traffic origination for lookup.

Figure 6:
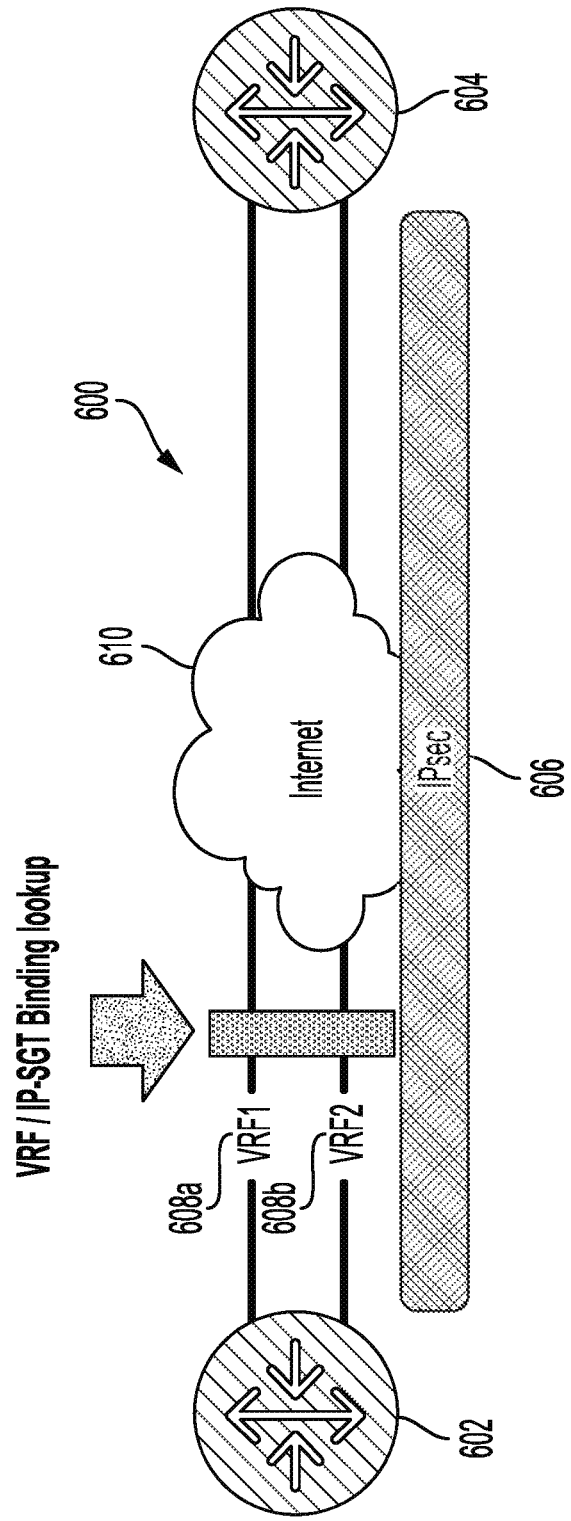
FIG. 6 illustrates a network architecture illustrating a flow of a data packet of the network traffic in accordance with some embodiments.

FIG. 6 illustrates a network architecture 600 illustrating a journey of a data packet of the network traffic as it travels over the Internet 610 from a VRF Router 602 to an IPSec SD-WAN Router 604 in accordance with the concepts disclosed herein. In some embodiments, the VRF Router 602 is the same device as the VRF Router/VRF routing gateway 520, while in other embodiments the VRF Router 602 is associated with the VRF Router/VRF routing gateway 520. In some embodiments, the IPSec SD-WAN Router 604 is the same device as the IPSec gateways 504, while in other embodiments the IPSec SD-WAN Router 604 is associated with the IPSec gateways 504. In some embodiments, the IPSec gateways 504 access the cloud-based network 510 services and servers. Packet traffic on the LAN side of IPSec Router 604 is routed over a WAN interface into IPSec tunnel 606. If it is determined that the packet traffic is bound for a destination that is part of the cloud-based network 510 service/server, the IPSec SD-WAN Router 604 updates the mapping of an IP Address on its LAN side and an IP address of the cloud-based network 510.

Next, the VRF Router 602 learns or looks up the IP-SGT bindings associated with the VRF 1 608a and VRF 2 608b (VRF collectively 608) and the destination of the packet traffic by the SD-WAN controller 526. If the destination of the traffic IP subnet falls in a range of IP address for IaaS (Infrastructure as a Service), the VRF Router 602 would transmit the packet traffic originating from the IPSec SD-WAN Router 604 on the VRF segment 608a and 608b associated with the IP-SGT binding. In order to map the incoming SD-WAN packet traffic, a global VRF-CFT (Common flow table) table of the ISE 508 that provides the mapping between the VRF and IP-SGT is updated to reflect the VRF-IP-SGT bindings mapping.

As a non-limiting example illustrating this concept, if packet traffic is routed to an AWS destination cloud, and if a VRF is associated with the AWS prefix (e.g., VRF 1 608a), then the packet traffic originating from the IPSec SD-WAN Router 604 will get routed on VRF 1 608a. Similarly, if the packet traffic originating from the IPSec SD-WAN Router 604 is accessing Microsoft Dynamic 365, or CRM, then such packet traffic may land on a separate VRF associated with CRM (e.g., VRF 2 608b), from a SDCI Router with multi-cloud network connectivity, to Azure ER Gateway Microsoft Public Service on VRF 2 608b. Thus, this technology enables LAN traffic from the IPSec SD-WAN Router 604 to reach destination servers 510 via the VRF Router 602.

When the cloud-based destination 510 server responds, the packet traffic from the cloud lands on the VRF Router 602 on service side. Then, the VRF Router 602 will inspect the traffic source IP and identify the VRF context, and IP-SGT bindings and follow routing to send the packet traffic via IPSec tunnel 606 to the IPSec Router 604 that originated that specific packet flow. Furthermore, as discussed further below, the technology further enables tunnel multi-plexing to send packet traffic via the IPSec tunnel 606 to the IPSec Router 604.

Figure 7:
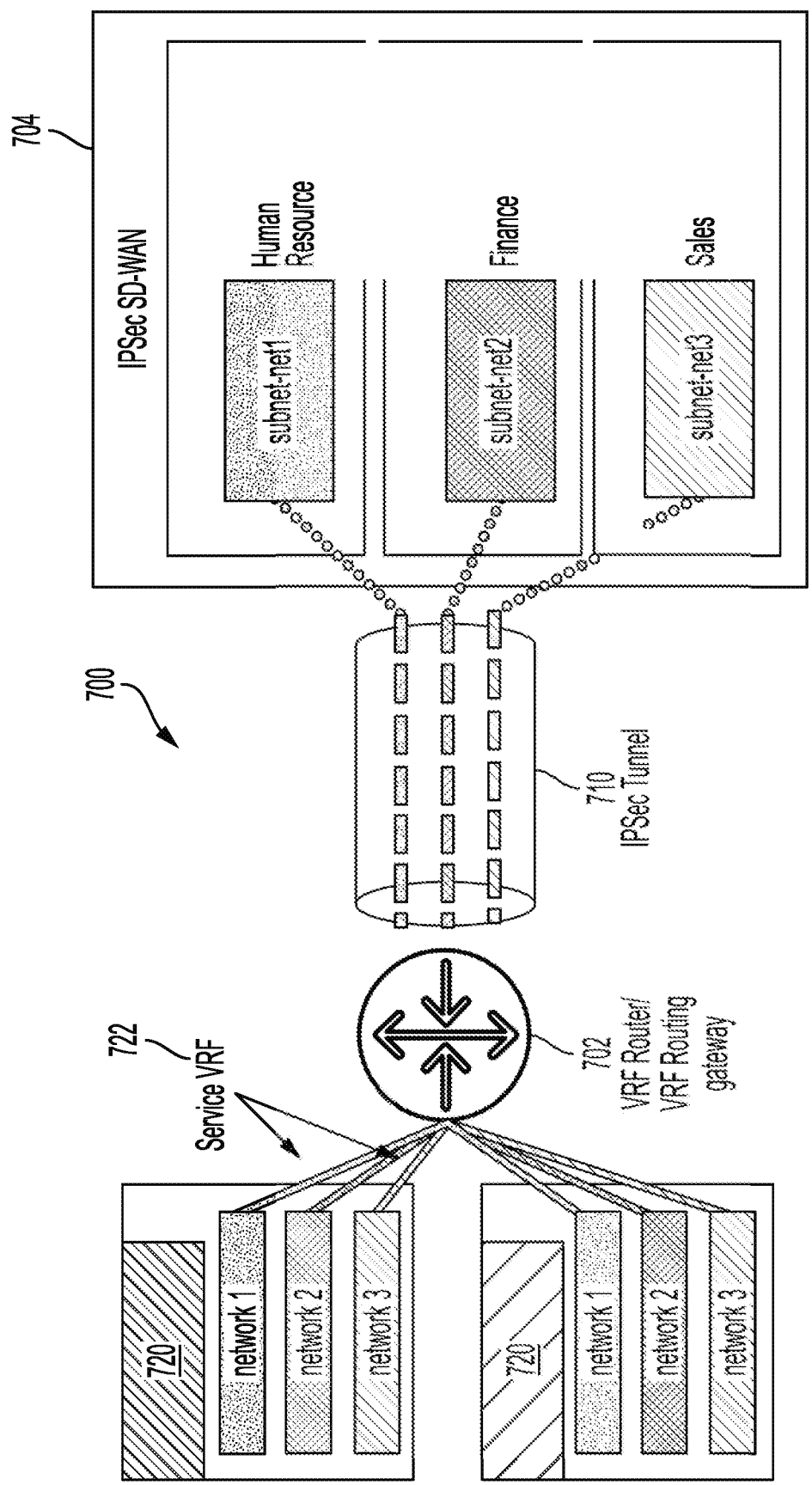
FIG. 7 illustrates a network architecture for IPSec tunnel multiplexing in accordance with some embodiments.

FIG. 7 illustrates a network architecture 700 for IPSec tunnel multiplexing. In particular, the technology disclosed herein supports network segmentation when connecting a VRF Router/VRF Routing gateway 702 with an IPSec SD-WAN 704 over an IPSec tunnel 710 to send and receive traffic from cloud-based networks 720. In particular, the disclosed technology may take incoming packet traffic and outgoing packet traffic, and may map a VPN 0 to any service VRF 722. This implementation follows the following flow. First, incoming packet traffic from IPSec SD-WAN 704 is transmitted on a VPN 0 VRF Router/VRF Routing gateway 702. From this and as discussed above, the IP-SGT binding is known and exchanged between the IPSec gateway controller 506, the SD-WAN controller 526, and the ISE 508 based on the packet destination in the SD-WAN Fabric. The technology then may auto-derive the VRF and map the VRF Router/VRF Routing gateway 702 incoming packet traffic to a service VRF 722 in the common flow table (CFT) of the ISE 508. Likewise, if a packet originated on the VRF Router/VRF Routing gateway 702, and the server happens to be on IPSec SD-WAN 704 side, the system may take the packet traffic out on service VRF 722 and send the traffic on VRF Router/VRF Routing gateway 702. In this circumstance, the system may map inside the CFT the IPSec tunnel 710 multiplexing information so when return traffic comes back on the same IPSec tunnel 710 from IPSec SD-WAN 704 end back to VRF Router/VRF Routing gateway 702 702, the CFT will have the VPN-Context to map it back to the service VRF 722, and ultimately the cloud-based network 720. Thus, the mapping of the IP-SGT binding to the VRF in the CFT enables the system to multiplex the VRF traffic into the IPSec tunnel 710 and confirm that the traffic arrives at and is sent to the correct destinations.

Figure 8:
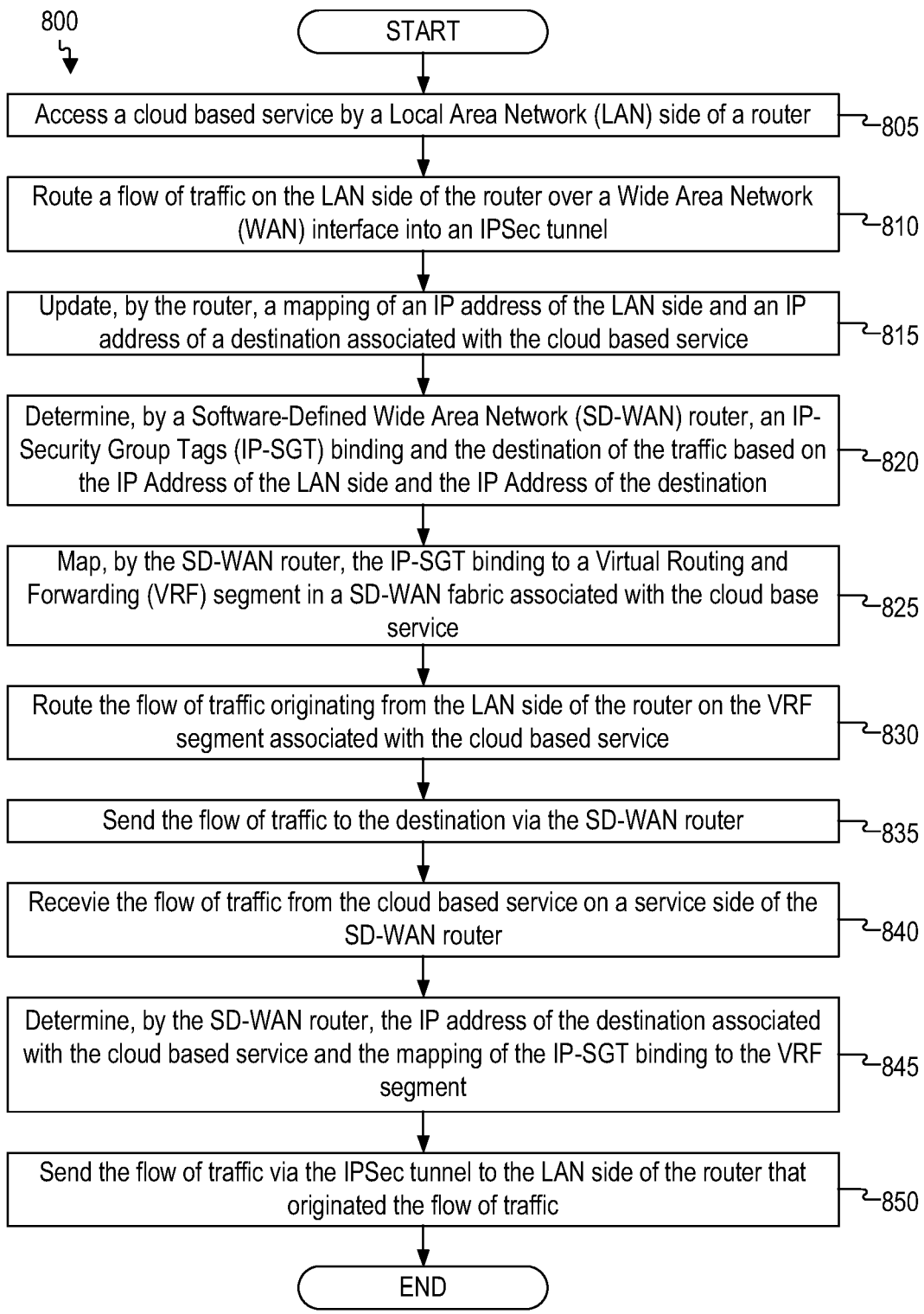
FIG. 8 illustrates an example method for routing packet traffic from an IPSec SD-WAN router to cloud-based services across a VRF Router/VRF routing gateway in accordance with some embodiments.

FIG. 8 illustrates an example method 800 for routing packet traffic from IPSec SD-WAN routers to cloud-based services across the VRF Router/VRF routing gateway. Although the example method 800 depicts a particular sequence of operations, the sequence may be altered without departing from the scope of the present disclosure. For example, some of the operations depicted may be performed in parallel or in a different sequence that does not materially affect the function of the method 800. In other examples, different components of an example device or system that implements the method 800 may perform functions at substantially the same time or in a specific sequence.

According to some examples, the method includes accessing a cloud based service by a Local Area Network (LAN) side of a router at block 805. For example, the IPSec gateways 504 illustrated in FIG. 5 may access the cloud based service by the LAN side of the router.

According to some examples, the method includes routing a flow of traffic on the LAN side of the router over a Wide Area Network (WAN) interface into an IPSec tunnel at block 810. For example, the IPSec gateways 504 illustrated in FIG. 5 may route the flow of traffic on the LAN side of the router over the WAN interface into the IPSec tunnel.

According to some examples, the method includes updating a mapping of an IP address of the LAN side and an IP address of a destination associated with the cloud based service by the router at block 815. For example, the IPSec gateway 504 illustrated in FIG. 5 may update the mapping of the IP address of the LAN side and the IP address of a destination associated with the cloud based service. In some embodiments, the flow of traffic is bound for the cloud based service.

According to some examples, the method includes determining an IP-Security Group Tags (IP-SGT) binding and the destination of the traffic based on the IP Address of the LAN side and the IP Address of the destination by a Software-Defined Wide Area Network (SD-WAN) router at block 820. For example, the VRF Router/VRF Router 602 illustrated in FIG. 6 may determine the IP-SGT binding and the destination of the traffic based on the IP Address of the LAN side and the IP Address of the destination. In some embodiments, the determination of the IP-SGT bindings only occurs if the destination IP address falls in a range of IP addresses for Infrastructure as a Service (IaaS). In some embodiments, the SD-WAN router is a Software-Defined Cloud Interconnect (SDCI) router.

According to some examples, the method includes mapping the IP-SGT binding to a Virtual Routing and Forwarding (VRF) segment in a SD-WAN fabric associated with the cloud base service by the SD-WAN router at block 825. For example, the VRF Router/VRF Router 602 illustrated in FIG. 6 may map the IP-SGT binding to the VRF segment in the SD-WAN fabric associated with the cloud base service. In some embodiments, the mapping of the IP-SGT binding to the VRF segment is updated on a global VRF-Common Flow Table (CFT).

According to some examples, the method includes routing the flow of traffic originating from the LAN side of the router on the VRF segment associated with the cloud based service at block 830. For example, the packet traffic illustrated in FIG. 6 from the LAN side of the router may land on the VRF segment associated with the cloud based service.

Further, the method comprises mapping one or more VRF segments from one or more cloud based services to a Virtual Private Network (VPN) associated with the IPSec tunnel. For example, the VRF Router/VRF routing gateway 702 illustrated in FIG. 7 may map one or more VRF segments from one or more cloud based services to a Virtual Private Network (VPN) associated with the IPSec tunnel. In some embodiments, the IPSec tunnel may perform multiplexing. In some embodiments, the mapping of the one or more VRF segments to the VPN is stored on a CFT. Further, the method comprises sending the flow of traffic via the IPSec tunnel based on the mapping.

According to some examples, the method includes sending the flow of traffic to the destination via the SD-WAN router at block 835. For example, the VRF Router/VRF Router 602 illustrated in FIG. 6 may send the flow of traffic to the destination.

According to some examples, the method includes routing the flow of traffic from the cloud based service on a service side of the VRF Router/VRF Router at block 840. For example, the VRF 608 illustrated in FIG. 6 may receive the flow of traffic from the cloud based service on a service side of the SD-WAN router.

According to some examples, the method includes determining the IP address of the destination associated with the cloud based service and the mapping of the IP-SGT binding to the VRF segment by the SD-WAN router at block 845. For example, the VRF Router/VRF Router 602 illustrated in FIG. 6 may determine the IP address of the destination associated with the cloud based service and the mapping of the IP-SGT binding to the VRF segment.

According to some examples, the method includes sending the flow of traffic via the IPSec tunnel to the LAN side of the router that originated the flow of traffic at block 850. For example, the VRF Router/VRF Router 602 illustrated in FIG. 6 may send the flow of traffic via the IPSec tunnel to the LAN side of the router that originated the flow of traffic, or the IPSec SD-WAN Router 604 illustrated in FIG. 6.

Figure 9:
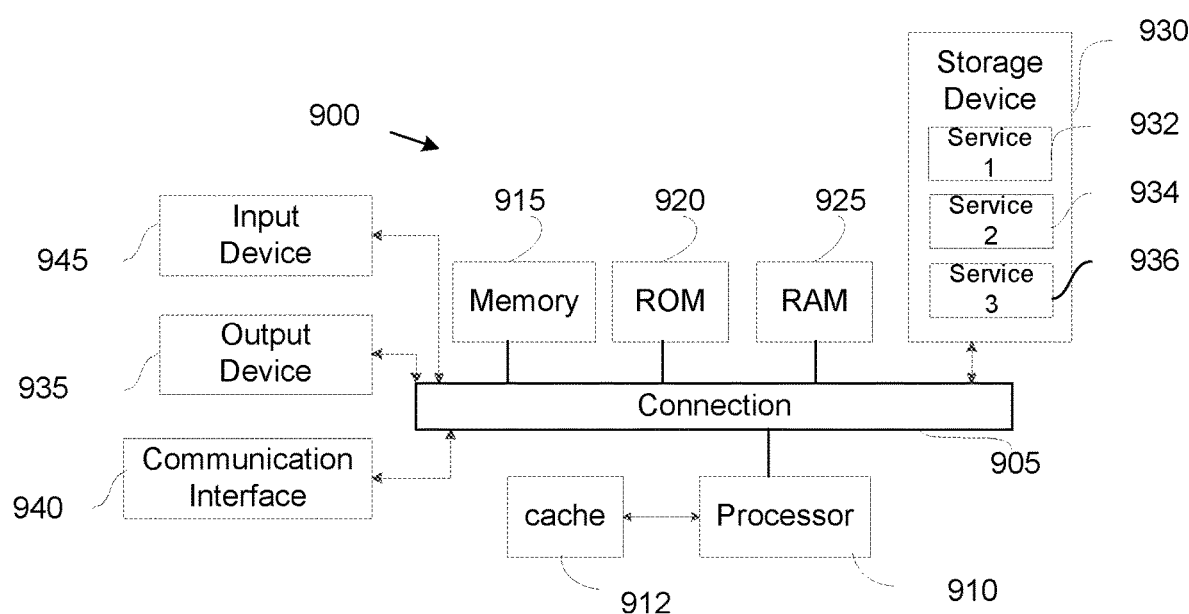
FIG. 9 shows an example of a system for implementing aspects of the present technology.

FIG. 9 shows an example of computing system 900, which can be for example any computing device, or any component thereof in which the components of the system are in communication with each other using connection 905. Connection 905 can be a physical connection via a bus, or a direct connection into processor 910, such as in a chipset architecture. Connection 905 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 910 and connection 905 that couples various system components including system memory 915, such as read-only memory (ROM) 920 and random access memory (RAM) 925 to processor 910. Computing system 900 can include a cache of high-speed memory 912 connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900. Computing system 900 can include communications interface 940, which can generally govern and manage the user input and system output. There is no restriction on operating on any particular hardware arrangement, and therefore the basic features here may easily be substituted for improved hardware or firmware arrangements as they are developed.

Storage device 930 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per sc.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspect 1. A method comprising: receiving, by a Virtual Routing and Forwarding (VRF) Router, a flow of traffic bound for a destination from a Local Area Network (LAN) side of a Software-Defined Wide Area Network (SD-WAN) router over an IPSec tunnel, wherein the destination of the flow of traffic is a cloud based service; determining, by the VRF Router, an IP address associated with the LAN side of the SD-WAN router; determining, by the VRF Router, a VRF segment in a SD-WAN fabric associated with the cloud based service; mapping, by the VRF Router, the VRF segment to the IP address of the LAN side; forwarding the flow of traffic originating from the LAN side of the router on the VRF segment associated with the cloud based service; and sending the flow of traffic to the destination via the VRF Router.

Aspect 2. The method of aspect 1, further comprising: receiving, by the VRF Router, the flow of traffic from the destination; determining, by the VRF Router, the IP address of the destination associated with the cloud based service and the mapping of the IP address of the LAN side to the VRF segment; and sending the flow of traffic via the IPSec tunnel to the LAN side of the SD-WAN router.

Aspect 3. The method of aspect 1, wherein the IP address of the LAN side of the SD-WAN router includes a IP-Security Group Tag (IP-SGT) binding.

Aspect 4. The method of aspect 3, wherein the IPSec tunnel performs multiplexing, the method further comprising: mapping, by the VRF Router, one or more IP-SGT bindings to one or more VRF segments associated with one or more cloud-based destinations; multiplexing the VRF segments in the IPSec tunnel; segmenting, by the VRF Router, the one or more VRF segments based on the mapping; and sending the traffic to the one or more cloud-based destinations by the one or more VRF segments.

Aspect 5. The method of aspect 3, wherein the mapping of the IP-SGT binding to the VRF segment is updated on a global VRF-Common Flow Table.

Aspect 6. The method of aspect 5, wherein the global VRF-Common Flow Table is stored within an Identity Service Engine associated with the VRF Router and the LAN side of the SD-WAN router.

Aspect 7. The method of aspect 1, wherein the VRF Router is a Software-Defined Cloud Interconnect (SDCI) router.

Aspect 8. A system comprising: a storage configured to store instructions; and a processor configured to execute the instructions and cause the processor to: receive, by a Virtual Routing and Forwarding (VRF) Router, a flow of traffic bound for a destination from a Local Area Network (LAN) side of a Software-Defined Wide Area Network (SD-WAN) router over an IPSec tunnel, wherein the destination of the flow of traffic is a cloud based service; determine, by the VRF Router, an IP address associated with the LAN side of the SD-WAN router; determine, by the VRF Router, a VRF segment in a SD-WAN fabric associated with the cloud based service; map, by the VRF Router, the VRF segment to the IP address of the LAN side; forward the flow of traffic originating from the LAN side of the router on the VRF segment associated with the cloud based service; and send the flow of traffic to the destination via the VRF Router.

Aspect 9. The system of aspect 8, wherein the processor is configured to execute the instructions and cause the processor to: receive, by the VRF Router, the flow of traffic from the destination; determine, by the VRF Router, the IP address of the destination associated with the cloud based service and the mapping of the IP address of the LAN side to the VRF segment; and send the flow of traffic via the IPSec tunnel to the LAN side of the SD-WAN router.

Aspect 10. The system of aspect 8, wherein the IP address of the LAN side of the SD-WAN router includes a IP-Security Group Tag (IP-SGT) binding.

Aspect 11. The system of aspect 10, wherein the IPSec tunnel performs multiplexing, the wherein the processor is configured to execute the instructions and cause the processor to: map, by the VRF Router, one or more IP-SGT bindings to one or more VRF segments associated with one or more cloud-based destinations; multiplex the VRF segments in the IPSec tunnel; segment, by the VRF Router, the one or more VRF segments based on the mapping; and send the traffic to the one or more cloud-based destinations by the one or more VRF segments.

Aspect 12. The system of aspect 10, wherein the mapping of the IP-SGT binding to the VRF segment is updated on a global VRF-Common Flow Table.

Aspect 13. The system of aspect 12, wherein the global VRF-Common Flow Table is stored within an Identity Service Engine associated with the VRF Router and the LAN side of the SD-WAN router.

Aspect 14. The system of aspect 8, wherein the VRF Router is a Software-Defined Cloud Interconnect (SDCI) router.

Aspect 15. A method comprising: receiving, by a Virtual Routing and Forwarding (VRF) Router, a flow of traffic bound for a Local Area Network (LAN) side of a Software-Defined Wide Area Network (SD-WAN) router from a cloud-based service; determining, by the VRF Router, a VRF segment in a SD-WAN fabric associated with the cloud-based service; determining, by the VRF Router, an IP address associated with the LAN side of the SD-WAN router; mapping, by the VRF Router, the VRF segment to the IP address of the LAN side; forwarding the flow of traffic originating from the cloud-based service from the VRF segment associated with the cloud based service to an IPSec tunnel associated with the LAN side of the SD-WAN router; and sending the flow of traffic to the LAN side of the SD-WAN router via the IPSec tunnel.

Aspect 16. The method of aspect 1, further comprising: receiving, by the VRF Router, the flow of traffic from the LAN side of the SD-WAN router over the IPSec tunnel; determining, by the VRF Router, the VRF segment associated with the cloud based service based on the mapping of the IP address of the LAN side to the VRF segment; and sending, by the VRF Router, the flow of traffic to the cloud based service over the VRF segment.

Aspect 17. The method of aspect 15, wherein the IP address of the LAN side of the SD-WAN router includes an IP-Security Group Tag (IP-SGT) binding.

Aspect 18. The method of aspect 17, wherein the IPSec tunnel performs multiplexing, the method further comprising: mapping, by the VRF Router, one or more IP-SGT bindings to one or more VRF segments associated with one or more cloud-based destinations; multiplexing the VRF segments in the IPSec tunnel; segmenting, by the VRF Router, the one or more VRF segments based on the mapping; and sending the traffic to the one or more cloud-based destinations by the one or more VRF segments.

Aspect 19. The method of aspect 17, wherein the mapping of the IP-SGT binding to the VRF segment is updated on a VRF-Common Flow Table.

Aspect 20. The method of aspect 19, wherein the VRF-Common Flow Table is stored within an Identity Service Engine associated with the VRF Router and the LAN side of the SD-WAN router.

What is claimed is:

1. A method comprising:
   receiving, by a Virtual Routing and Forwarding (VRF) router, a flow of traffic bound for a destination from a Local Area Network (LAN) side of a Software-Defined Wide Area Network (SD-WAN) router over an IPSec tunnel, wherein the destination of the flow of traffic is a cloud based service;
   determining, by the VRF Router, an IP address associated with the LAN side of the SD-WAN router;
   determining, by the VRF Router, a VRF segment in a SD-WAN fabric associated with the cloud based service;
   mapping, by the VRF Router, the VRF segment to the IP address of the LAN side;
   forwarding the flow of traffic originating from the LAN side of the router on the VRF segment associated with the cloud based service; and
   sending the flow of traffic to the destination via the VRF Router.

2. The method of claim 1, further comprising:
   receiving, by the VRF Router, the flow of traffic from the destination;
   determining, by the VRF Router, the IP address of the destination associated with the cloud based service and the mapping of the IP address of the LAN side to the VRF segment; and
   sending the flow of traffic via the IPSec tunnel to the LAN side of the SD-WAN router.

3. The method of claim 1, wherein the IP address of the LAN side of the SD-WAN router includes an IP-Security Group Tag (IP-SGT) binding.

4. The method of claim 3, wherein the IPSec tunnel performs multiplexing, the method further comprising:
   mapping, by the VRF Router, one or more IP-SGT bindings to one or more VRF segments associated with one or more cloud-based destinations;
   multiplexing the VRF segments in the IPSec tunnel;
   segmenting, by the VRF Router, the one or more VRF segments based on the mapping; and
   sending the traffic to the one or more cloud-based destinations by the one or more VRF segments.

5. The method of claim 3, wherein the mapping of the IP-SGT binding to the VRF segment is updated on a global VRF-Common Flow Table.

6. The method of claim 5, wherein the global VRF-Common Flow Table is stored within an Identity Service Engine associated with the VRF Router and the LAN side of the SD-WAN router.

7. The method of claim 1, wherein the VRF Router is a Software-Defined Cloud Interconnect (SDCI) router.

8. A system comprising:
   a storage configured to store instructions; and
   a processor configured to execute the instructions and cause the processor to:
   receive, by a Virtual Routing and Forwarding (VRF) Router, a flow of traffic bound for a destination from a Local Area Network (LAN) side of a Software-Defined Wide Area Network (SD-WAN) router over an IPSec tunnel, wherein the destination of the flow of traffic is a cloud based service;
   determine, by the VRF Router, an IP address associated with the LAN side of the SD-WAN router;
   determine, by the VRF Router, a VRF segment in a SD-WAN fabric associated with the cloud based service;
   map, by the VRF Router, the VRF segment to the IP address of the LAN side;
   forward the flow of traffic originating from the LAN side of the router on the VRF segment associated with the cloud based service; and
   send the flow of traffic to the destination via the VRF Router.

9. The system of claim 8, wherein the processor is configured to execute the instructions and cause the processor to:

receive, by the VRF Router, the flow of traffic from the destination;

determine, by the VRF Router, the IP address of the destination associated with the cloud based service and the mapping of the IP address of the LAN side to the VRF segment; and send the flow of traffic via the IPSec tunnel to the LAN side of the SD-WAN router.

10. The system of claim 8, wherein the IP address of the LAN side of the SD-WAN router includes an IP-Security Group Tag (IP-SGT) binding.

11. The system of claim 10, wherein the IPSec tunnel performs multiplexing, the wherein the processor is configured to execute the instructions and cause the processor to:

map, by the VRF Router, one or more IP-SGT bindings to one or more VRF segments associated with one or more cloud-based destinations;

multiplex the VRF segments in the IPSec tunnel;

segment, by the VRF Router, the one or more VRF segments based on the mapping; and send the traffic to the one or more cloud-based destinations by the one or more VRF segments.

12. The system of claim 10, wherein the mapping of the IP-SGT binding to the VRF segment is updated on a global VRF-Common Flow Table.

13. The system of claim 12, wherein the global VRF-Common Flow Table is stored within an Identity Service Engine associated with the VRF Router and the LAN side of the SD-WAN router.

14. The system of claim 8, wherein the VRF Router is a Software-Defined Cloud Interconnect (SDCI) router.

15. A method comprising:

receiving, by a Virtual Routing and Forwarding (VRF) Router, a flow of traffic bound for a Local Area Network (LAN) side of a Software-Defined Wide Area Network (SD-WAN) router from a cloud-based service;

determining, by the VRF Router, a VRF segment in a SD-WAN fabric associated with the cloud-based service;

determining, by the VRF Router, an IP address associated with the LAN side of the SD-WAN router;

mapping, by the VRF Router, the VRF segment to the IP address of the LAN side;

forwarding the flow of traffic originating from the cloud-based service from the VRF segment associated with the cloud based service to an IPSec tunnel associated with the LAN side of the SD-WAN router; and sending the flow of traffic to the LAN side of the SD-WAN router via the IPSec tunnel.

16. The method of claim 15, further comprising:

receiving, by the VRF Router, the flow of traffic from the LAN side of the SD-WAN router over the IPSec tunnel;

determining, by the VRF Router, the VRF segment associated with the cloud based service based on the mapping of the IP address of the LAN side to the VRF segment; and sending, by the VRF Router, the flow of traffic to the cloud based service over the VRF segment.

17. The method of claim 15, wherein the IP address of the LAN side of the SD-WAN router includes an IP-Security Group Tag (IP-SGT) binding.

18. The method of claim 17, wherein the IPSec tunnel performs multiplexing, the method further comprising:

mapping, by the VRF Router, one or more IP-SGT bindings to one or more VRF segments associated with one or more cloud-based destinations;

multiplexing the VRF segments in the IPSec tunnel;

segmenting, by the VRF Router, the one or more VRF segments based on the mapping; and sending the traffic to the one or more cloud-based destinations by the one or more VRF segments.

19. The method of claim 17, wherein the mapping of the IP-SGT binding to the VRF segment is updated on a VRF-Common Flow Table.

20. The method of claim 19, wherein the VRF-Common Flow Table is stored within an Identity Service Engine associated with the VRF Router and the LAN side of the SD-WAN router.

* * * * *